United States Patent
Huang

(10) Patent No.: US 7,541,919 B1
(45) Date of Patent: Jun. 2, 2009

(54) WIRELESS TIRE PRESSURE AND TEMPERATURE DETECTING SYSTEM

(75) Inventor: Shiao-Hwa Huang, Daya Township, Taichung County (TW)

(73) Assignee: Mobiletron Electronics Co., Ltd., Taichung County (TW)

( * ) Notice: Subject to any disclaimer, the term of this patent is extended or adjusted under 35 U.S.C. 154(b) by 311 days.

(21) Appl. No.: 11/466,052

(22) Filed: Aug. 21, 2006

(51) Int. Cl.
*B60C 23/00* (2006.01)

(52) U.S. Cl. .............. 340/445; 340/539.22; 340/691.1; 340/693.9

(58) Field of Classification Search .............. 340/442, 340/445–448; 701/29
See application file for complete search history.

(56) References Cited

U.S. PATENT DOCUMENTS 6,232,875 B1 * 5/2001 DeZorzi ............... 340/442

2005/0030169 A1 * 2/2005 Okubo ............... 340/442

* cited by examiner

*Primary Examiner*—Thomas J Mullen
(74) *Attorney, Agent, or Firm*—Egbert Law Offices PLLC

(57) ABSTRACT

The present invention provides a wireless tire pressure and tire temperature detecting system, using a wireless monitoring and transmission device with a centrifugal switch. When the tire rotational speed of the car reaches a certain speed, it turns on the centrifugal switch. The centrifugal switch is used to turn on the entire wireless monitoring and transmission device to detect, process signal, and transmit. The wireless monitoring and transmission device is not working, until the tire rotational speed of the car reaches a certain speed before it is initiated and causes power consumption. The present invention saves more power consumption than the conventional structure, which extends the shelf life of the wireless tire pressure and temperature detecting system as well as time involved to change the battery, which is practical and convenient.

4 Claims, 8 Drawing Sheets

WIRELESS TIRE PRESSURE AND TEMPERATURE DETECTING SYSTEM

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a tire detecting system, and more particularly to a new invention, which detects the tire pressure and temperature through a wireless device.

2. Description of Related Art Including Information Disclosed Under 37 CFR 1.97 and 37 CFR 1.98

Because automobiles have advantages, such as safety, comfort, and convenience, and because of increasing buying power from modern day consumers, the number of automobiles increases daily.

Arriving at the destination conveniently and safely is the most important thing for the consumer group who own automobiles. One of the factors that affects the safety of driving, besides the driver's physical well-being and degree of concentration, is whether the function and operation of the components are normal (such as braking system, tires, and ignition system), which is most important link. In terms of tires, factors that affect the safety include tire pressure and tire temperature in addition to the grooves of the tire surface. If the tire pressure is too high or insufficient, it will cause damages on the tires. Only when the tire pressure is at the right amount can the tire achieve its optimal performance. When the tire pressure is too high, the fraction of the tire when rolling becomes small. However, because the contact area between the tire and the ground is shortened, the middle of the tire is worn out quickly. Because the tire's surface tension expands, it creates damages as well as cracks. On the other hand, when the tire pressure is insufficient, the fraction of the tire when rolling becomes great, gas consumption increases, and the wear and tear on both sides of the tire increases relatively. Meanwhile, it increases the tire temperature and causes surface or ply of tire to exfoliate easily.

When the vehicle is driving, the ply and the surface of the tire continue to rub against the ground, which increases the tire temperature as well. When the tire temperature is overheated, blow out may occur.

The industry has developed some products that have a tire pressure alarm to detect the tire pressure. However, the units, such as sensors, and a signal processor and a sender, of the conventional tire pressure detector are built inside the tire. The units are working constantly regardless of when the automobile is moving or parked until the battery is dead. It obviously causes the battery to wear out quickly, and because it is difficult to change the battery of the detecting device of the tire pressure alarm, the tire must be taken of the rim to change the device. Therefore, a regular user cannot change it without taking to the garage, which causes the expense to increase.

Thus, to overcome the aforementioned problems of the prior art, it would be an advancement in the art to provide an improved structure that can significantly improve efficacy.

To this end, the inventor has provided the present invention of practicability after deliberate design and evaluation based on years of experience in the production, development and design of related products.

BRIEF SUMMARY OF THE INVENTION

The present invention provides a wireless tire pressure and tire temperature detecting system, and it primarily uses a wireless monitoring and transmission device with centrifugal switch. With this invention, when the tire rotational speed (which is car speed) of the car reaches a certain speed, it turns on the centrifugal switch 22. The centrifugal switch 22 is used to turn on the entire wireless monitoring and transmission device to detect, process signals, and transmit. In other words, the wireless monitoring and transmission device is not working, until the tire rotational speed (car speed) of the car reaches a certain speed before it is initiated and caused to consume power. Compared to the conventional structure, the present invention saves more power than the conventional structure, which extends the shelf life of the wireless tire pressure and temperature detecting system as well as time involved to change the battery, which is practical and convenient.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
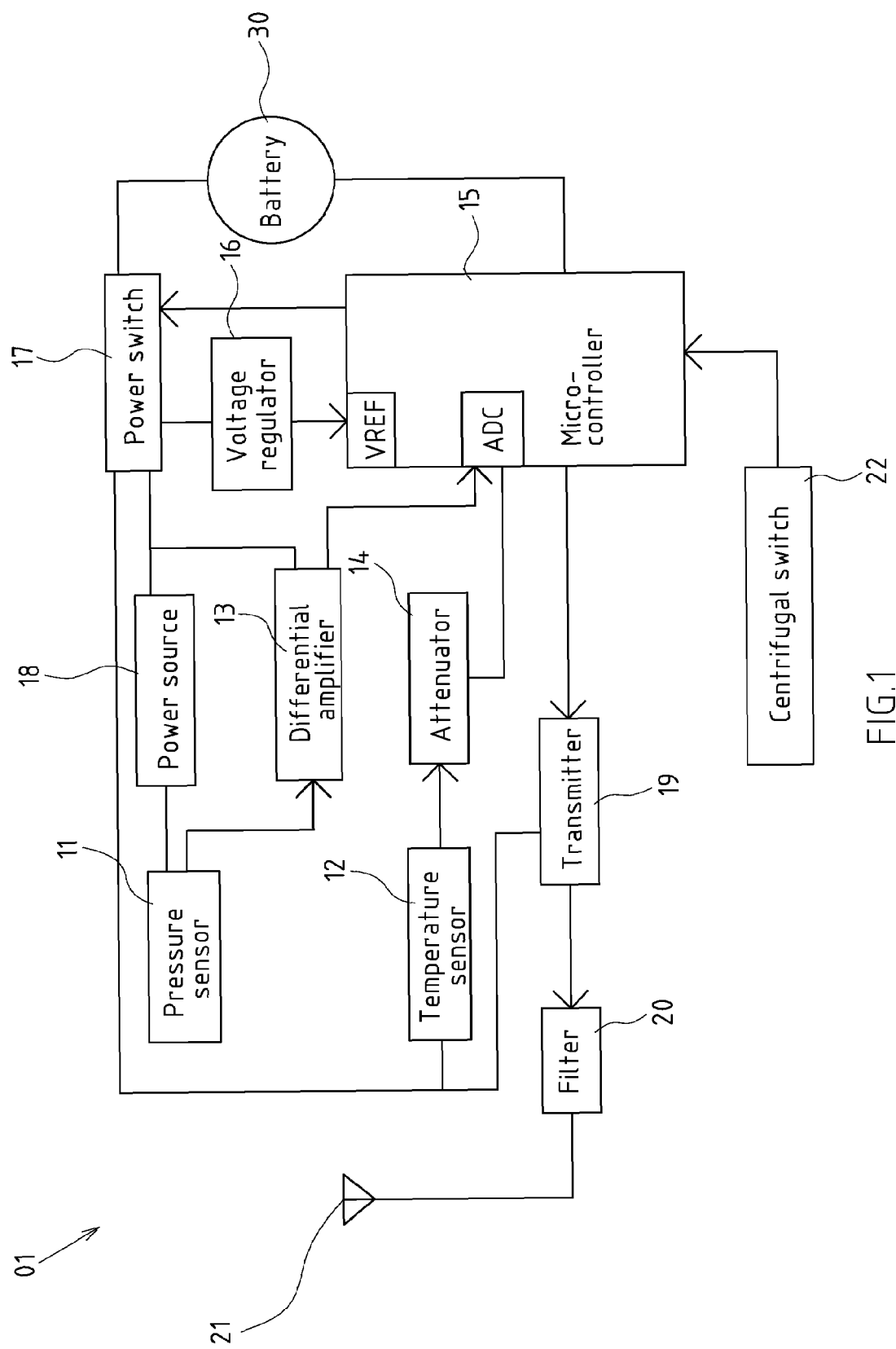
FIG. 1 shows a schematic view of the block diagram of the system of the present invention.
Figure 2A:
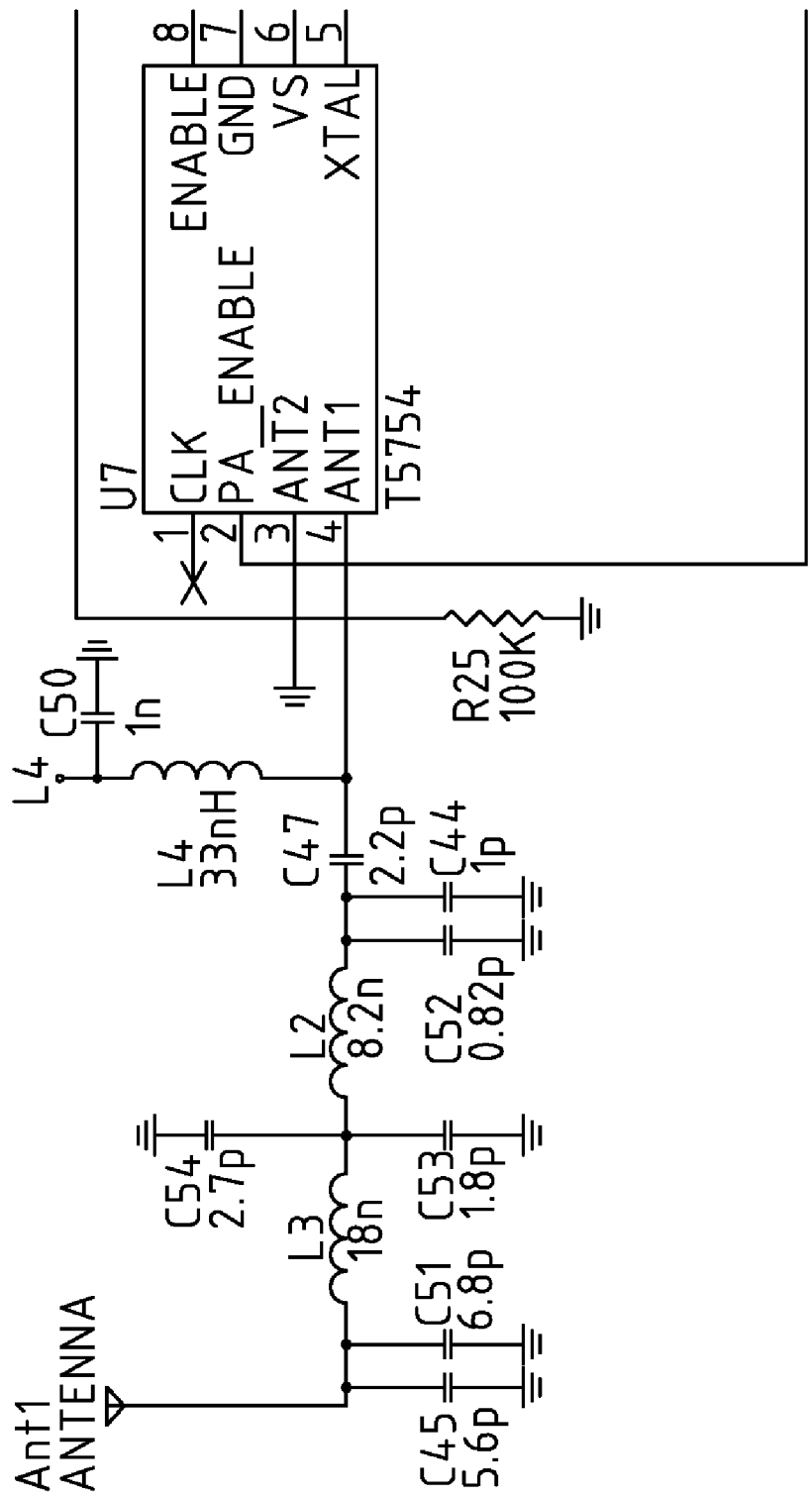
FIGS. 2A-2E show enlarged partial schematic views of the circuit diagram of the present invention.
Figure 2B:
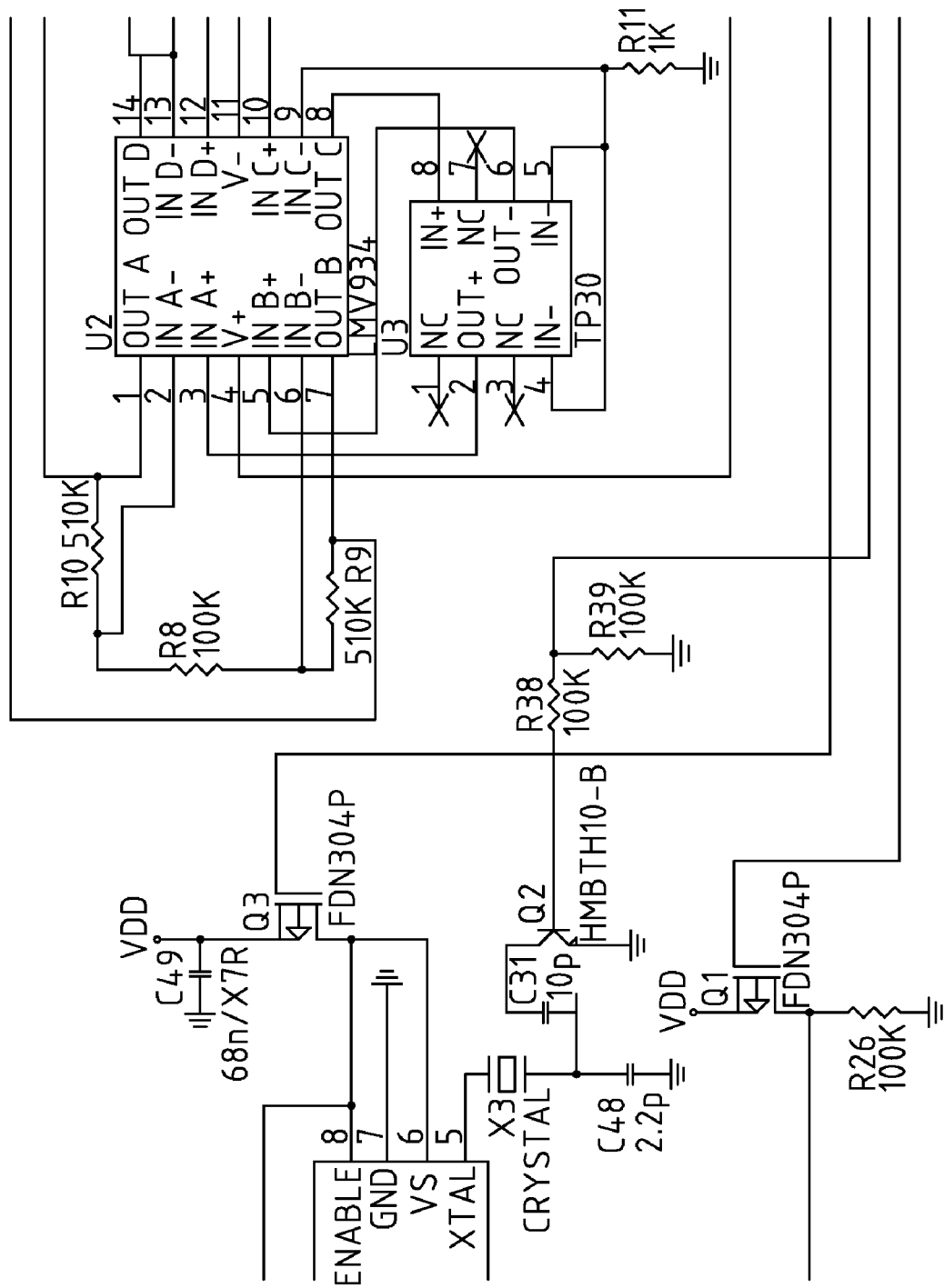
Figure 2C:
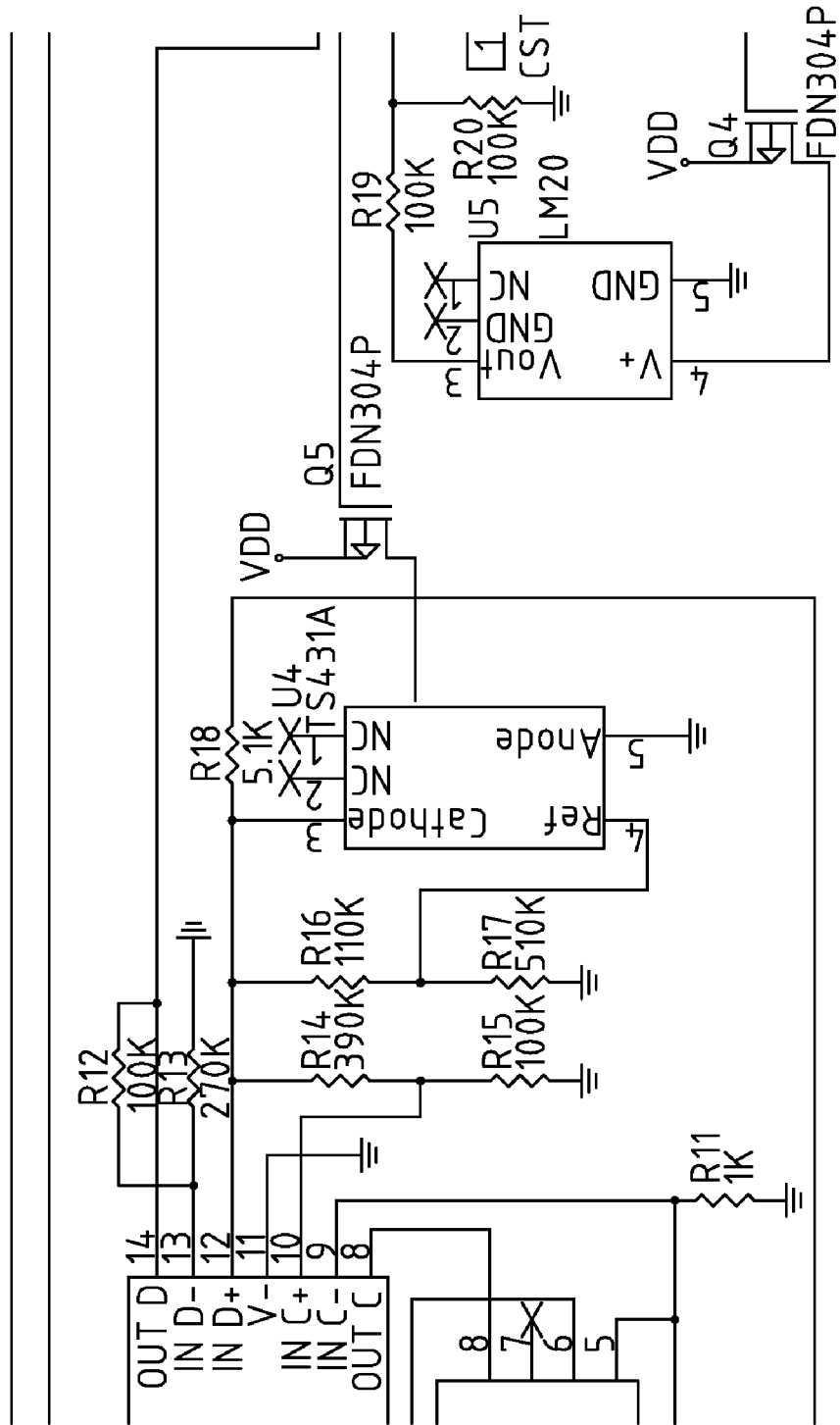
Figure 2D:
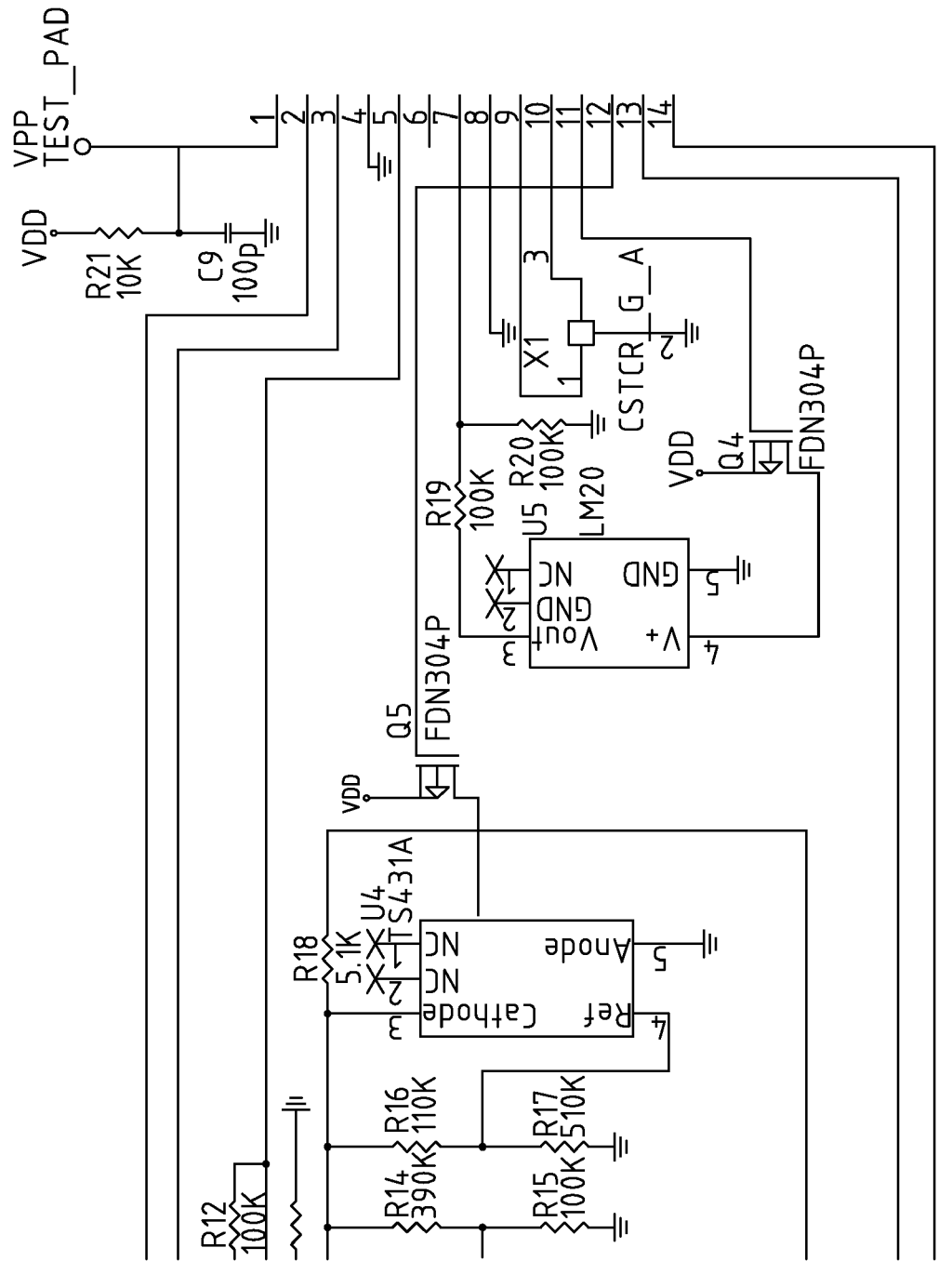
Figure 2E:
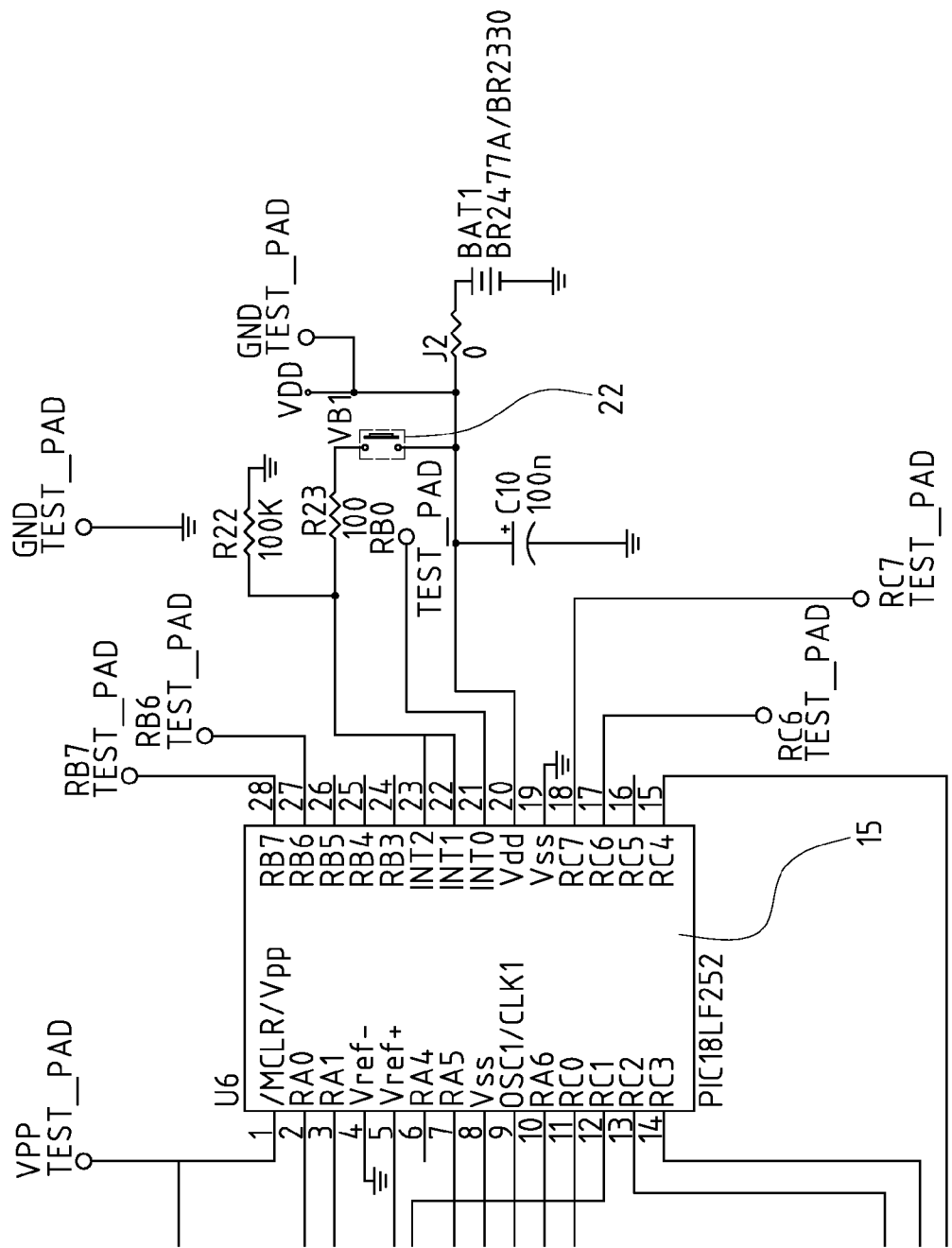

As shown in FIGS. 1 and 2, there is a wireless tire pressure and temperature detecting system embodied in the present invention. The present embodiment is for description only, and the scope of the patent is not limited to this structure. The wireless tire pressure and temperature detecting system comprises a wireless monitoring and transmission device 01.

The wireless monitoring and transmission device 01 comprises a sensor unit, which includes a pressure sensor 11 and a temperature sensor 12. The pressure sensor 11 senses the pressure inside the tire, and the temperature sensor 12 senses the temperature inside the tire.

The invention also includes a signal processing unit with a differential amplifier 13, an attenuator 14, and a micro-controller 15. The differential amplifier 13 is connected to the pressure sensor 11, and the pressure signal obtained from pressure sensor 11 is sent out after it is amplified. The attenuator 14 is connected to the temperature sensor 12, and the temperature signal obtained from the temperature sensor 12 is sent out after it is processed. The micro-controller 15 processes the pressure signal and temperature signal sent out from the differential amplifier 13 and attenuator 14 mentioned above.

A power control unit includes a voltage regulator 16, a switch 17, and a current source 18. The voltage regulator 16 is connected to the micro-controller 15, and the switch 17 is connected to the micro-controller 15 and pre-determined power supply (the present embodiment uses battery 30) to control the operation of the wireless monitoring and transmission device 01. The current source 18 is connected to the pressure sensor 11 and the switch 17.

A signal transmitting unit includes a transmitter 19, a wave filter 20, and an antenna. The transmitter 19 is connected to the micro-controller 15, and the pressure signal and temperature signal are sent out after they are processed by micro-controller 15. The wave filter 20 is connected to the transmitter 19, and it filters the signal sent out by the transmitter 19. The antenna 21 is connected to the wave filter 20, and the signal sent out by the transmitter is sent out in resonance style after it is filtered to digital reception display device.

Figure 3:
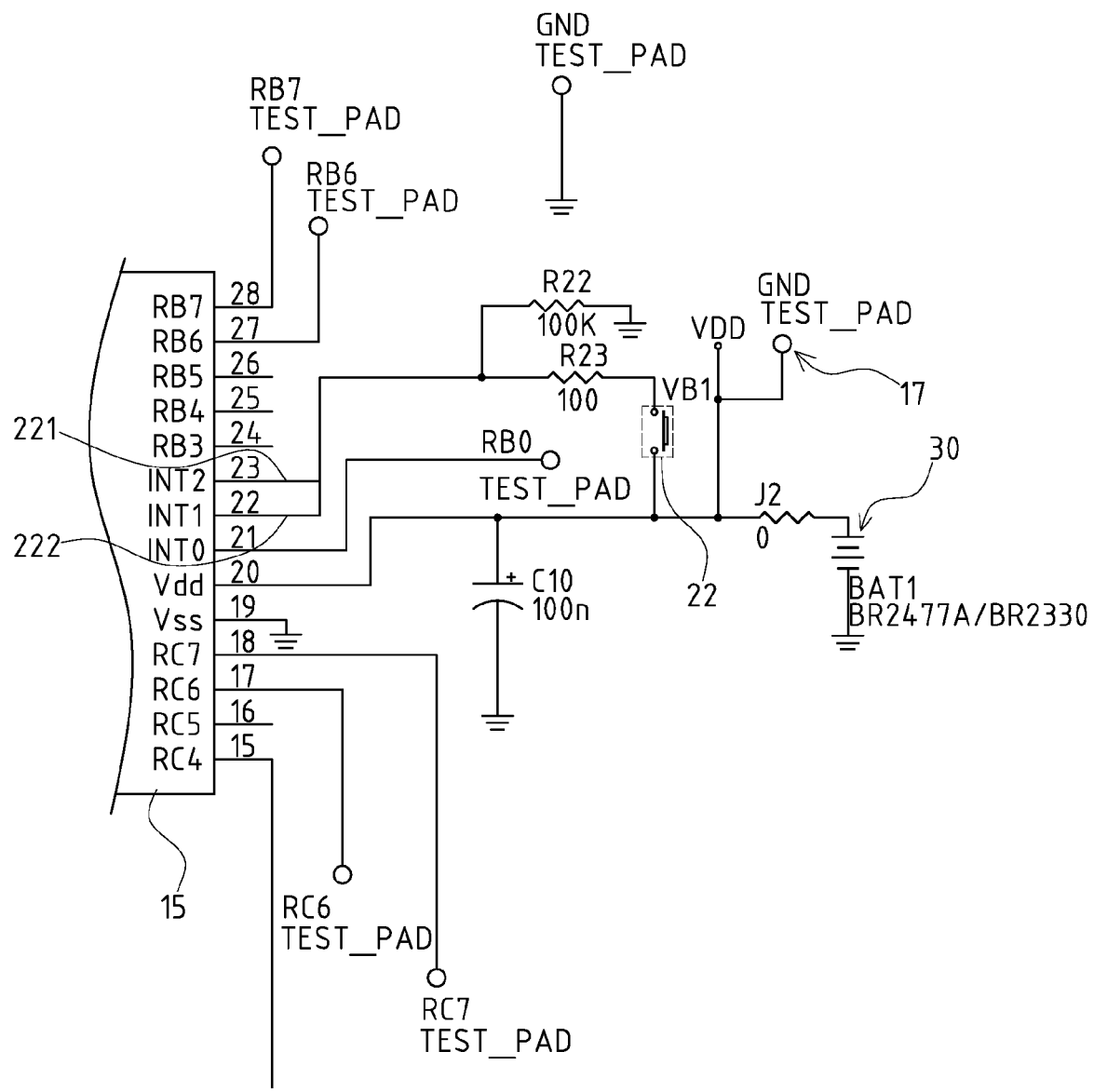
FIG. 3 shows the enlarged schematic view of a particular portion of the circuit system of the present invention.

The core feature of the present invention is a centrifugal switch 22, which is connected to the micro-controller 15. When the tire rotational speed (which is car speed) is higher than the predetermined value (such as: 10 kilometers per hour, or 20 kilometers per hour), it will automatically turn on the entire wireless monitoring and transmission device 01. When the tire rotational speed (which is car speed) is lower than the time of the predetermined value, it will automatically shut off the entire wireless monitoring and transmission device 01. As shown in FIG. 3, the centrifugal switch 22 is connected to two terminals of the micro-controller 15. One of the terminals 221 is connected to the lead (which is INT2 in the figure) to turn on the micro-controller 15, and the other terminal 222 detects the operational condition of the centrifugal switch 22. By using this connection, when the tire rotational speed (which is car speed) of the car reaches a certain speed, it turns on the centrifugal switch 22. The centrifugal switch 22 is used to turn on the entire wireless monitoring and transmission device 01 to detect, process signal, and transmit. For these reasons, the present invention saves more power than the conventional structure, which extends the shelf life of the wireless tire pressure and temperature detecting system as well as time involved to change the battery, which is practical and convenient.

Figure 4:
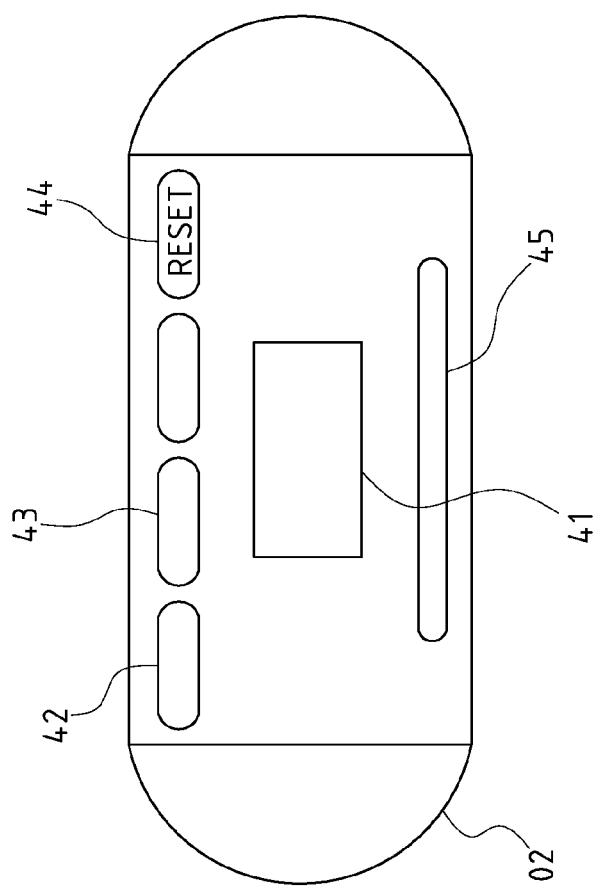
FIG. 4 shows an elevation view of the digital reception display device of the present invention.

As shown in FIG. 4, a digital reception display device 02 comprises a display panel 41 and a predetermined number of buttons. The buttons mentioned herein include a temperature display button 42, a pressure display button 43, a setting button 44, and an alarm indicator 45.

Figure 5:
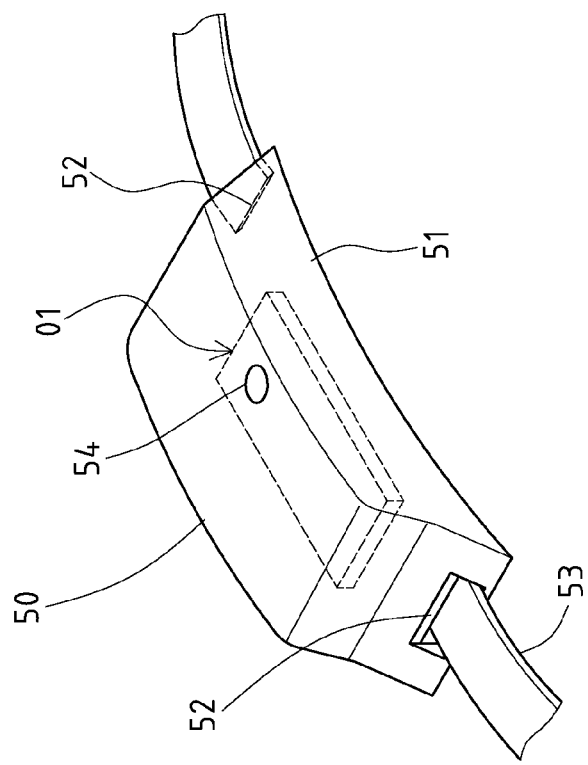
FIG. 5 shows a perspective view of the wireless monitoring and transmission device of the present invention.

In terms of its concrete structure, as shown in FIG. 5, the wireless monitoring and transmission device 01, which can be placed inside a casing 50, and the bottom of the casing 50 has arcuate surface 51. Two ends of the casing 50 have a through hole 52 for the piercing steel bar 53. The casing 50 has a vent hole 54, so that the pressure sensor and temperature sensor inside the wireless monitoring and transmission device 01 can sense the pressure and temperature inside the tires.

By the system mentioned above, the operation of the present invention is described as follows:

1. When the car speed exceeds 10 kilometers per hour, the centrifugal switch of the wireless monitoring and transmission device is turned on.
2. When the car speed exceeds 10 kilometers per hour, three signals are turned on, 40 seconds in between.
3. The pressure and temperature is measured every 6 seconds when driving.
4. Five signals are sent every 5-10 minutes when driving to send the current signal of tire pressure and temperature to the digital reception display device to the driver seat.
5. If the tire pressure and temperature is not normal when driving, ten signals are sent immediately every 40 seconds, and it repeats every ten minutes.
6. When the car is idling for more than 5 minutes, the shut off system makes the system return to the standby mode to save the battery and power consumption, and to extend the shelf life of battery.

I claim:

1. A wireless tire pressure and temperature detecting system comprising:
   a wireless monitoring and transmission device, and
   a digital reception display device cooperative with said wireless monitoring and transmission device so as to receive signals therefrom, said wireless monitoring and transmission device comprising:
   a sensor unit having a pressure sensing means and a temperature sensing means, said pressure sensing means for sensing a pressure inside the tire, said temperature sensing means for sensing a temperature inside the tire;
   a signal processing unit having a differential amplifier and an attenuator and a micro-controller means, said differential amplifier being connected to said pressure sensing means so as to produce an amplified pressure signal, said attenuator being connected to said temperature sensing means so as to produce a temperature signal, said micro-controller means for processing the pressure signal and the temperature signal;
   a power control unit having a voltage regulator, a switching means, and a current source, said voltage regulator being connected to the micro-controller means, said switching means being connected to the micro-controller means for controlling an operation of said wireless monitoring and transmission device, said current source being connected to said pressure sensing means and to said switching means; and
   a signal transmitting unit having a transmitting means, a wave filter, and an antenna, said transmitting means connected to the micro-controller means for transmitting the pressure signal and temperature signal from said micro-controller means, said wave filter connected to said transmitting means so as to filter transmitted signals sent out by said transmitting means, said antenna being connected to the wave filter, said transmitting means for sending a resonant signal to said digital reception display device after being filtered; and
   a centrifugal switching means connected to a pair of terminals of said micro-controller means, said centrifugal switching means for automatically turning on said wireless monitoring and transmission device when a rotational speed of the tire exceeds a predetermined value, said centrifugal switching means for automatically turning off said wireless monitoring and transmission device when the rotational speed of the tire is less than the predetermined value, one of said pair of terminals suitable for turning on said micro-controller means, the other of said pair of terminals suitable for detecting an operation condition of said centrifugal switching means.

2. The wireless tire pressure and temperature detecting system of claim 1, said digital reception display device comprising:
 a display panel having a plurality of buttons; and
 an alarm indicator connected to said display panel.

3. The wireless tire pressure and temperature detecting system of claim 2, said plurality of buttons comprising a temperature display button and a pressure display button and a setting button.

4. The wireless tire pressure and temperature detecting system of claim 1, further comprising:
 a casing having said wireless monitoring and transmission device therein, said casing having an arcuate surface thereon, said casing having opposite ends each with a hole therein;
 a steel bar extending through the holes of said casing, said casing having a vent hole formed thereon.

* * * * *